(No Model.) 2 Sheets—Sheet 2.
J. L. RUSSELL.
SLIME FILTER.
No. 301,460. Patented July 1, 1884.
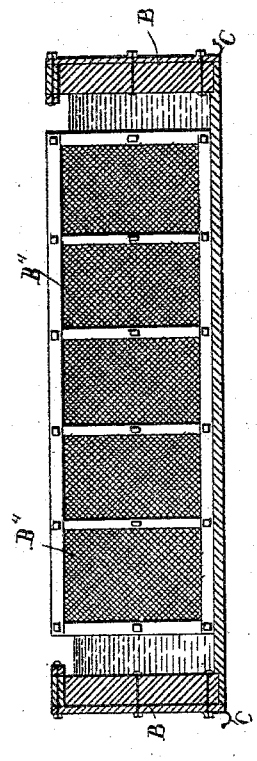
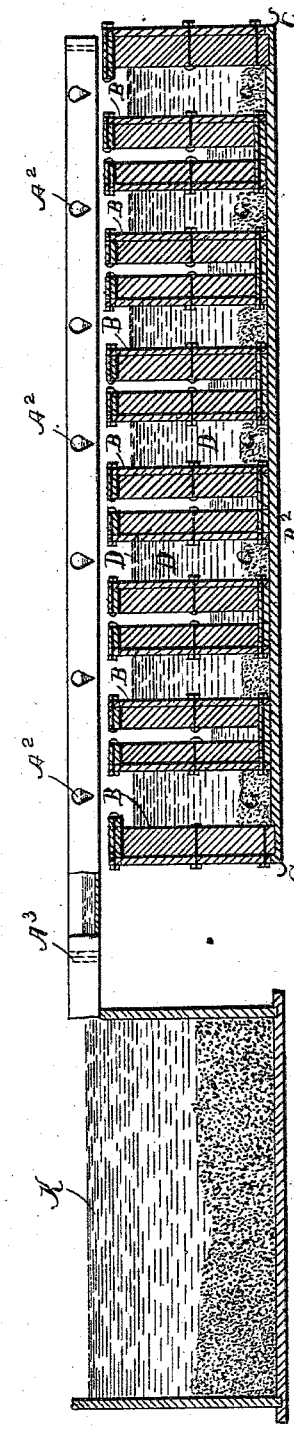
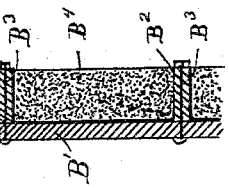
ATTEST—
E. F. Murdock
Edward Webster
INVENTOR—
John L. Russell
H. A. Snow.
Atty.

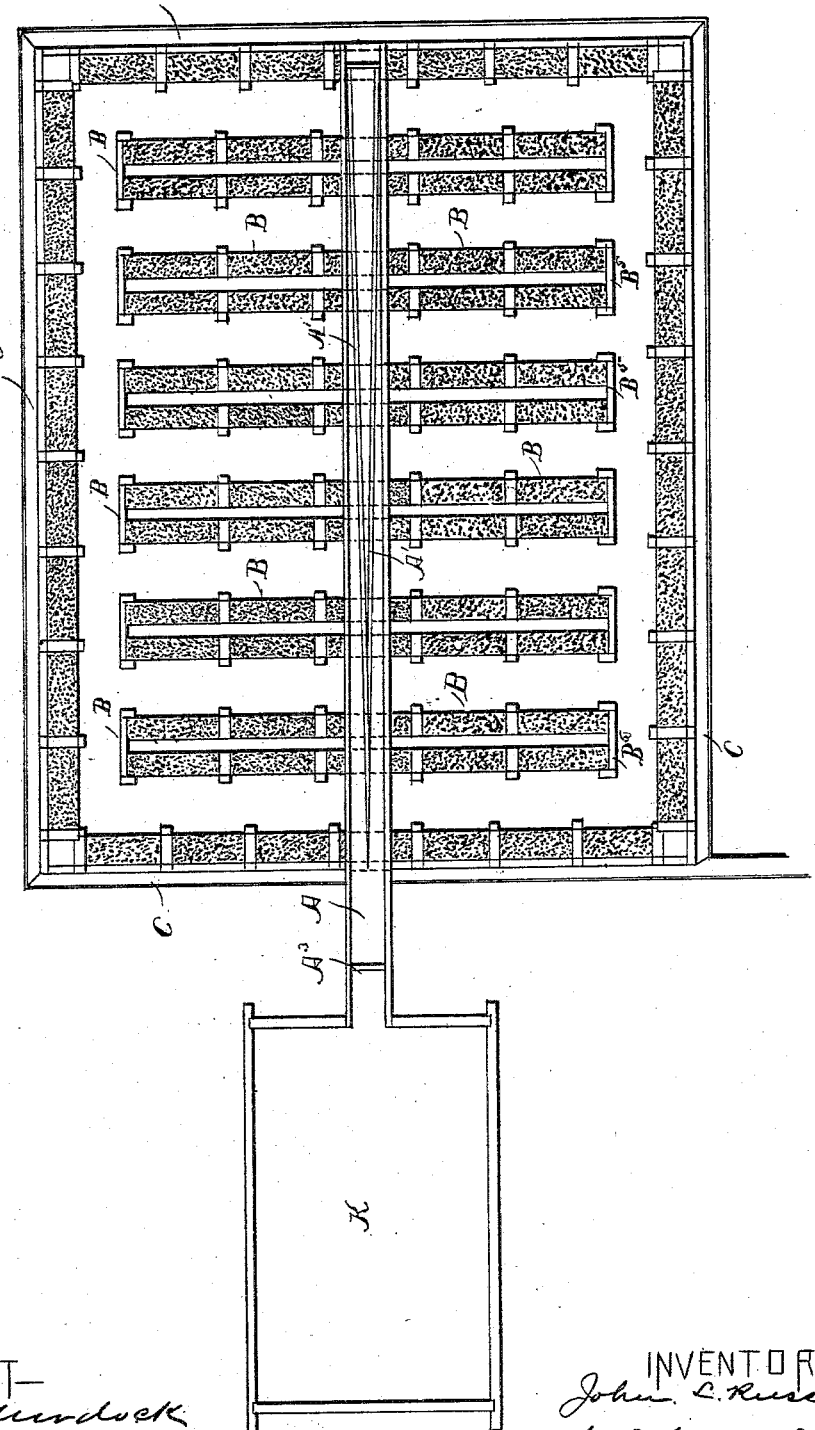

UNITED STATES PATENT OFFICE.

JOHN LYTLE RUSSELL, OF DENVER, COLORADO, ASSIGNOR OF ONE-HALF TO SILSBEE E. CORSON, OF SAME PLACE.

SLIME-FILTER.

SPECIFICATION forming part of Letters Patent No. 301,460, dated July 1, 1884.

Application filed March 25, 1884. (No model.)

*To all whom it may concern:*

Be it known that I, JOHN L. RUSSELL, of Denver, in the county of Arapahoe and State of Colorado, have invented a new and useful Improvement in Slime-Filters; and I do hereby declare that the following is a full, clear, and exact description of the invention, which will enable others skilled in the art to which it appertains to make and use it, reference being had to the accompanying drawings, forming a part thereof.

My invention relates to improvements in slime-filters.

The objects of my invention are to save the light value known as chlorides, sulphurets, floured gold, silver, mercury, and other metals and minerals, and all light values known to be lost in the treatment of gold, silver, or other ores by any process of working, and to filter the water so that it can be again used. I attain these objects by the mechanism shown in the accompanying drawings, in which—

Figure 1 is a plan view of my invention. Fig. 2 is a longitudinal sectional view. Fig. 3 is a transverse section. Fig. 4 is a detail view of my perpendicular filter.

A is a trough leading out of the sand-box K over the top of the filter-sections B B. In the center are two adjustable partitions, A', which control the flow of water through the floodgates $A^2$ by widening or narrowing the passage, as shown in drawings. In the passage A is a cut-off gate, $A^3$.

B B are filtering-sections, made in the following manner, Fig. 4: On the uprights B' are fastened the cross-ties $B^2$, which are held together by bolts $B^3$, thus forming a frame to which a wire-gauze, $B^4$, is fastened, forming boxes that are filled with charcoal, sponge, or any known filtering substances. This framework is held in pairs, as shown in drawings, by the end boards, $B^5$.

C C are gutters into which the filtered water flows, and by which it is carried to reservoir.

D is water charged with light values and floured mercury, and flows along sluice A, through gates $A^2$, and into the filter B, where the light values sink to the bottom, as shown, G, and water wastes off through the filters B B until the filter B becomes clogged with the light values and slimes. The filters B are then cleaned up and refilled with the filtering substance, and the same process is again gone through.

Having thus fully described my invention, what I claim, and desire to secure by Letters Patent, is—

1. The trough A, poised over filter-sections B, provided with adjustable partitions A' and gates $A^2$.

2. The combination of a sluice, A, provided with outlets $A^2$, adjustable partitions A', filter-sections B, and gutters C.

3. The combination of the sand-box K, sluice A, provided with adjustable partitions A', gates $A^2$, filters B B, composed of the frame B', $B^2$, $B^3$, and $B^4$, and wire-gauzes, and gutters C.

In testimony that I claim the foregoing I append my signature.

JOHN LYTLE RUSSELL.

Witnesses:
H. S. HUTCHINGS,
S. E. CORSON.